April 25, 1933.  F. GELSTHARP  1,905,849
METHOD OF MAKING SHEET GLASS
Filed Dec. 17, 1931
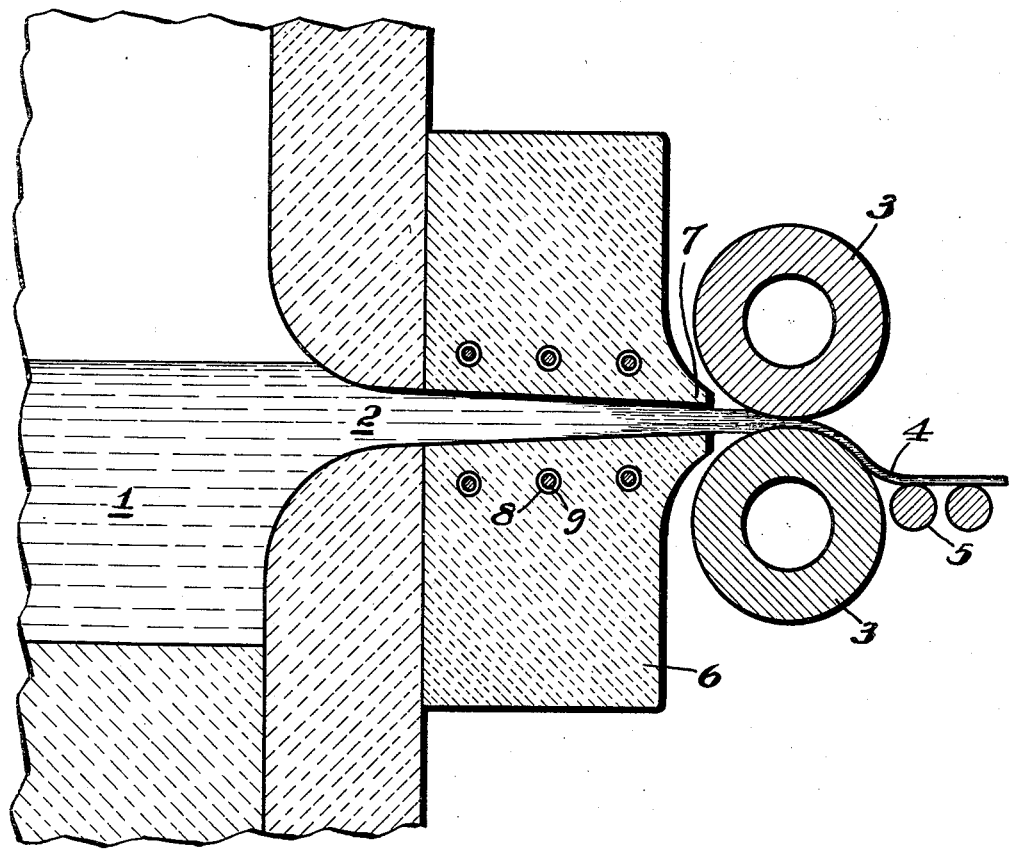
INVENTOR.
Frederick Gelstharp
BY Bradley & Bee
ATTORNEYS.

Patented Apr. 25, 1933

1,905,849

UNITED STATES PATENT OFFICE

FREDERICK GELSTHARP, OF TARENTUM, PENNSYLVANIA, ASSIGNOR TO PITTSBURGH PLATE GLASS COMPANY, A CORPORATION OF PENNSYLVANIA

METHOD OF MAKING SHEET GLASS

Application filed December 17, 1931. Serial No. 581,586.

The invention relates to a method of making sheet glass continuously from a tank by a rolling operation and involves an improvement over the method disclosed in my Patent No. 1,560,079, dated November 31, 1925. The object of the present method is to produce glass of improved quality containing less blister and fewer bubbles and has to do particularly with the method of withdrawing the glass from the tank. In the operation of the apparatus as shown in my patent, the natural flow of molten glass through the orifice or slot in the wall of the tank, and due to the head pressure of the tank, is very substantially retarded by the speed of rolling, the glass being at a high temperature and low viscosity until it meets the rolls and becomes chilled. Under these conditions, the rolls squeeze the chilled masses of glass due to the contact of the glass with the rolls to form a sheet and there is a continuous push backward of the excess glass in the center of the wedge formed by the two roll surfaces. This causes a choking at the mouth of the orifice resulting in an agitation or whirling motion of the glass in the orifice against the lips. This agitation tends to cause blisters which are an objectionable form of bubbles adjacent the surface of the sheet which is produced.

The object of the present invention is to overcome the difficulty as to agitation, and briefly stated, I have found that this can be accomplished by adjusting the rate of flow through the orifice to the speed of rotation of the rolls in such manner that the natural flow of glass through the orifice incident to the head pressure of the tank is substantially equal to the peripheral speed of rotation of the rolls, the glass thus being withdrawn from the orifice at substantially the same speed as the glass would flow from the orifice if the rolls were not operating. Under these conditions, there is no holding back of the glass in the outlet slot and consequently no agitation, and as a result the sheet produced is free from the defects incident to such agitation. One form of apparatus which may be used to advantage in carrying out the process is shown in a diagrammatic way in the accompanying drawing, wherein:

Figure 1 is a partial vertical section through the outlet end of a standard melting tank and through the rolls between which the sheet is formed.

Referring to the drawing, 1 is the outlet end of the tank provided with an outlet 2 opposite whose ends are the usual sizing rolls 3, 3 which are made hollow for the circulation of water therethrough and which are driven in any suitable manner. The sheet of glass 4 is conducted over apron rolls 5 and through a roller leer in a manner well known in the art, and as shown in my patent heretofore referred to.

In order to elongate the slot 2 and increase the viscosity of the glass passing therethrough, the refractory block 6 is employed whose outer side is formed into a lip 7 for conducting the body of glass to the roll pass. The block is preferably provided with perforations 8 carrying resisting heating elements 9 so that the block may be heated when the operation is first started in order to promote the flow of glass therethrough. After the operation is well under way, the flow of electric current through the heating elements may be discontinued, although in some cases it may be desirable to provide a certain amount of heat in order to maintain the block at a uniform temperature. The use of the elongated slot reduces the temperature of the outflowing glass and its viscosity so that the rolls 3, 3 may be driven at a lower speed than would otherwise be the case. If desired, and in order to increase the cooling effect, after the process is in operation, air may be blown through the perforations 8.

In operation the speed of rotation of the rolls is adjusted so that the glass is carried away from the outer end of the slot at the speed at which the glass would naturally flow through the slot if the rolls were not in place, or at a speed which is only slightly in excess of such speed. A slight stretching of the sheet due to such excess speed will prevent any tendency of the glass to sag in the small interval in which it is unsupported. It will be understood that any suitable outlet from the tank may be employed, the primary consideration being the method step heretofore discussed involving the withdrawal of the glass by the rolls at a speed such that there is no retardation in the body of glass behind the pass of the rolls and hence no agitation due to this cause.

What I claim is:

1. A method of making sheet glass which comprises melting and maintaining in a tank furnace a reservoir of molten glass, supplying the glass by the head pressure of the tank through a slot in the wall of the tank and between the pass of a pair of cooled rolls which constitutes a continuation of said slot and driving the rolls at a peripheral speed at least equal to the natural rate of flow of the glass to the roll incident to said head pressure, so that the glass flows through the slot without retardation by the rolls.

2. A method of withdrawing glass continuously in sheet form from a reservoir of molten glass having an outlet slot through its side walls and a pair of driven cooled rolls whose pass is in opposition to said slot and constitutes a continuation thereof, which consists in retarding the flow of glass through the slot by cooling it and thus increasing its viscosity and in rotating the rolls at a rate of speed such that the flow of the glass through the slot due to the head pressure of the glass in the tank is at least equal to such flow without such rolls.

In testimony whereof, I have hereunto subscribed my name this tenth day of December 1931.

FREDERICK GELSTHARP.